US012112680B1

(12) United States Patent
Zhou et al.

(10) Patent No.: US 12,112,680 B1
(45) Date of Patent: Oct. 8, 2024

(54) POWER-ON METHOD OF DISPLAY PANEL AND DISPLAY PANEL

(71) Applicant: HKC CORPORATION LIMITED, Shenzhen (CN)

(72) Inventors: Mancheng Zhou, Shenzhen (CN); Yuanping Zhang, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/447,632

(22) Filed: Aug. 10, 2023

(30) Foreign Application Priority Data

Mar. 21, 2023 (CN) ......................... 202310305794.1

(51) Int. Cl.
*G09G 3/3233* (2016.01)
*G09G 3/20* (2006.01)

(52) U.S. Cl.
CPC ......... *G09G 3/2074* (2013.01); *G09G 3/3233* (2013.01); *G09G 2300/0819* (2013.01); *G09G 2300/0842* (2013.01); *G09G 2310/08* (2013.01); *G09G 2330/026* (2013.01)

(58) Field of Classification Search
CPC ......... G09G 3/3233; G09G 2300/0819; G09G 2300/0842; G09G 3/2074
See application file for complete search history.

(56) References Cited

U.S. PATENT DOCUMENTS

2016/0321991 A1* 11/2016 Song ................ H10K 59/80518
2022/0172681 A1* 6/2022 Kim ..................... G09G 3/3266

* cited by examiner

*Primary Examiner* — Abbas I Abdulselam
(74) *Attorney, Agent, or Firm* — Hodgson Russ LLP

(57) ABSTRACT

A display panel includes a plurality of sub-pixels, where each sub-pixel is correspondingly provided with a drive circuit. The drive circuit includes a light emitting assembly and a storage capacitor. The power-on method of the display panel includes: acquiring a power-on signal, and generating a first initialization instruction, a second initialization instruction and a display instruction according to the power-on signal; initializing the storage capacitor according to the first initialization instruction; initializing the light emitting assembly according to the second initialization instruction after initializing the storage capacitor, and at least providing preset gray-scale voltages for the light emitting assembly, so as to perform a preheating startup on the light emitting assembly; and controlling the light emitting assembly to display normally according to the display instruction after initializing the light emitting assembly.

18 Claims, 11 Drawing Sheets

POWER-ON METHOD OF DISPLAY PANEL AND DISPLAY PANEL

CROSS-REFERENCE TO RELATED APPLICATION

This application claims priority to Chinese Patent Application No. 202310305794.1, filed on Mar. 21, 2023, the entire disclosure of which is incorporated herein by reference.

TECHNICAL FIELD

The present disclosure relates to the technical field of display panels, in particular to a power-on method of a display panel and the display panel.

BACKGROUND

In an OLED (Organic Lighting Emitting Diode) display panel, the brightness of a display screen will have an obvious jump when the display screen changes from an off state to an on state. In this process, the brightness of the display panel will jump from a lower state to a higher state.

SUMMARY

There are provided a power-on method of a display panel and the display panel, according to embodiments of the present disclosure. The technical solution is as below:

According to one aspect of the present disclosure, there is provided a power-on method of a display panel. The display panel includes a plurality of sub-pixels, each sub-pixel is correspondingly provided with a drive circuit, and the drive circuit includes a light emitting assembly and a storage capacitor. The power-on method of the display panel includes:

- acquiring a power-on signal, and generating a first initialization instruction, a second initialization instruction and a display instruction according to the power-on signal;
- initializing the storage capacitor according to the first initialization instruction;
- initializing the light emitting assembly according to the second initialization instruction after initializing the storage capacitor, and at least providing preset grayscale voltages for the light emitting assembly to perform preheating startup on the light emitting assembly; and
- controlling the light emitting assembly to display normally according to the display instruction after initializing the light emitting assembly.

According to a second aspect of the present disclosure, there is provided a display panel. The display panel is powered on by using the power-on method of the display panel described above.

It is to be understood that both the foregoing general description and the following detailed description are exemplary only and are not intended to limit the present disclosure.

BRIEF DESCRIPTION OF DRAWINGS

The above and other objects, features and advantages of the present disclosure will become more apparent by describing in detail exemplary embodiments thereof with reference to the accompanying drawings.

DETAILED DESCRIPTION OF THE EMBODIMENTS

Figure 1:
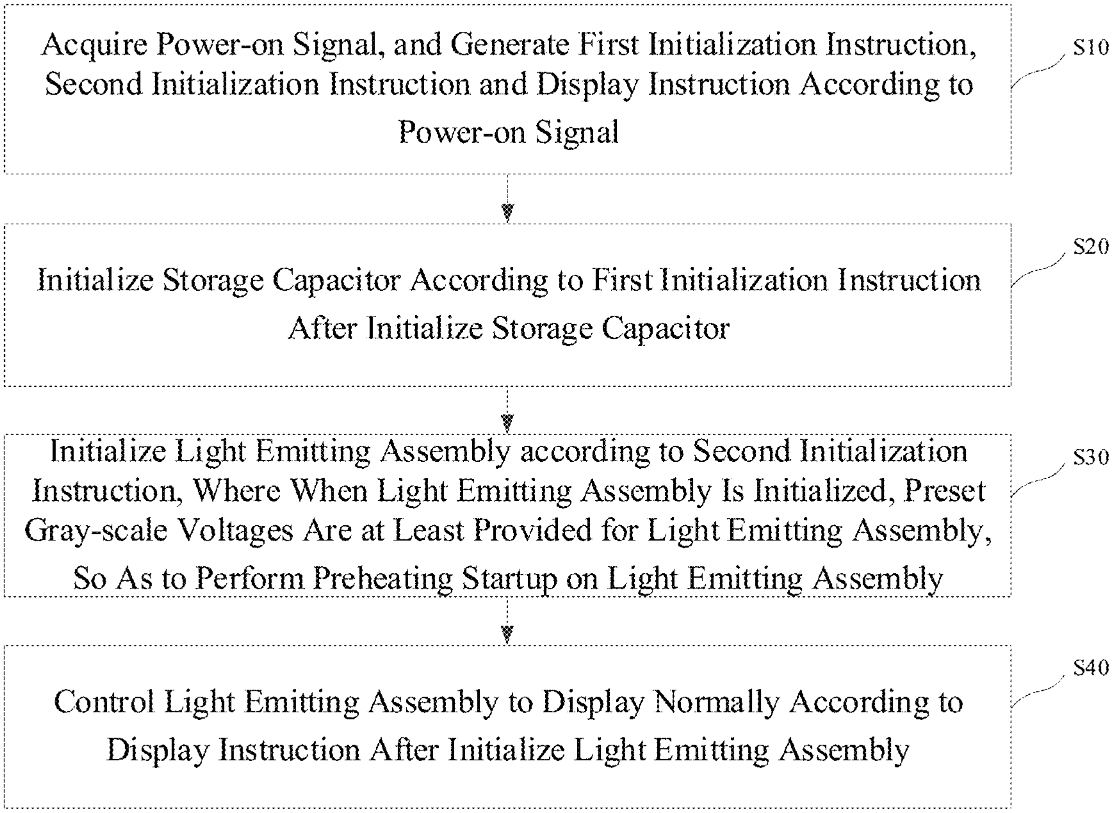
FIG. 1 is a flowchart of a power-on method of a display panel according to the present disclosure.

While the present disclosure is susceptible of embodiments in many different forms, those that are shown in the drawings and will be described in detail herein are only some of the embodiments, and it is understood that the description is to be considered as an exemplification of the principles of the present disclosure and is not intended to limit the present disclosure to that which is described herein.

Thus, a feature indicated in this specification is intended to describe one of the features of one embodiment of the present disclosure without implying that every embodiment of the present disclosure must have the described feature. Furthermore, it should be noted that this specification describes a number of features. Although certain features may be combined together to illustrate a possible system design, these features may also be used in other combinations that are not explicitly described. Thus, the described combinations are not intended to be limiting unless otherwise indicated.

In the embodiments shown in the drawings, directional indications (such as up, down, left, right, front, and back) are used to explain that the structure and movement of the various elements of the present disclosure are not absolute but relative. These descriptions are appropriate when the elements are in the positions shown in the drawings. If the description of the position of these elements changes, the indication of these directions changes accordingly.

Example embodiments will now be described more fully with reference to the accompanying drawings. The example embodiments are capable, however, of being embodied in many forms and should not be construed as limited to the exemplars set forth herein; rather, they are provided so that the description of the present disclosure will be thorough and complete, and will fully convey the concept of the example embodiments to those skilled in the art. The drawings are merely schematic illustrations of the present disclosure and are not necessarily drawn to scale. The same reference numerals in the drawings denote the same or similar parts, and repeated description thereof will be omitted.

The preferred embodiments of the present disclosure are further described in detail below with reference to the drawings of the present specification.

Embodiment 1

Figure 7:
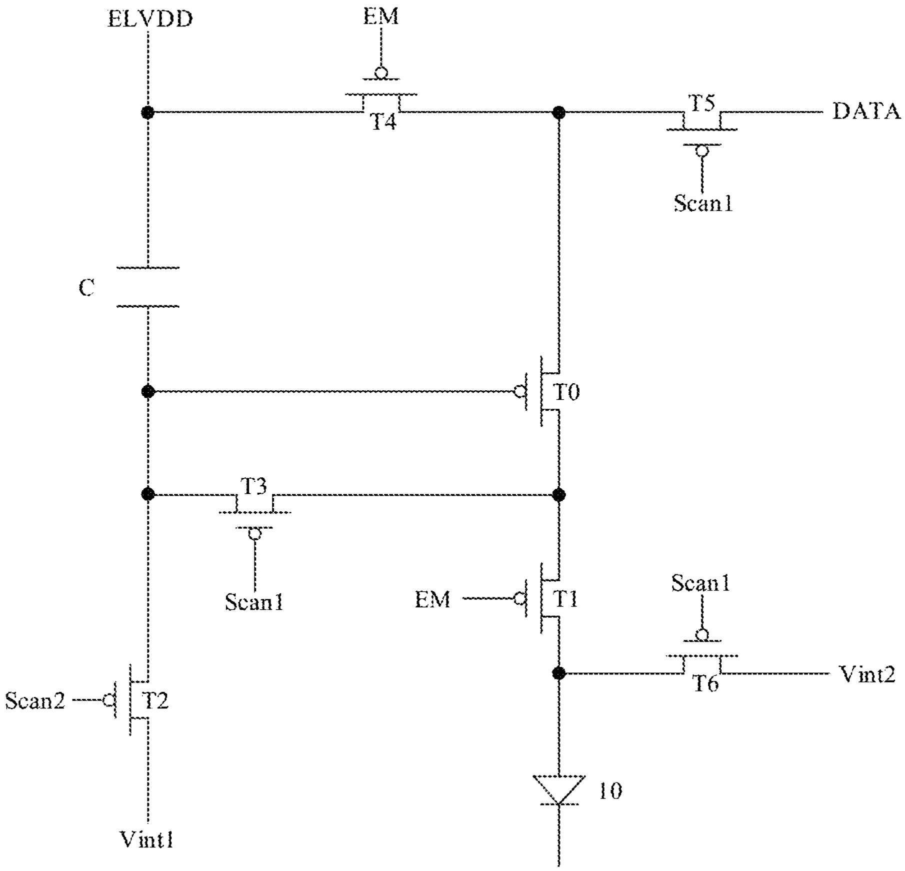
FIG. 7 is a schematic structural diagram of a drive circuit of a display panel according to the present disclosure.

Referring to FIG. 1 and FIG. 7, the present disclosure provides a power-on method of a display panel. The display panel includes drive circuits. The display panel includes a plurality of sub-pixels. Each sub-pixel is correspondingly provided with one drive circuit. Each drive circuit includes a light emitting assembly 10 and a storage capacitor C. The light emitting assemblies 10 may be arranged opposite to the sub-pixels. Each sub-pixel has at least one of red, green and blue filter layers. Light emitted by the light emitting assemblies 10 can pass through the filter layers of the sub-pixels, thereby displaying different colors. The drive circuits further include drive transistors T0 configured to control the light emitting assemblies 10 to be lit on.

The drive circuits further include the light emitting assemblies 10 and first response switches T1. First ends of the first response switches T1 are connected with second ends of the drive transistors T0, and second ends of the first response switches T1 are connected with anodes of the light emitting assemblies 10. Control ends of the drive transistors T0 are connected with first ends of the storage capacitors C. Second ends of the storage capacitors C are configured to be connected with a power supply voltage end ELVDD.

The drive circuits further include second response switches T2, third response switches T3, fourth response switches T4, fifth response switches T5, and sixth response switches T6. First ends of the second response switches T2 are configured to be connected with a first reset voltage end Vint1, and second ends of the second response switches T2 are connected with lines between the storage capacitors C and the drive transistors T0. First ends of the third response switches T3 are connected with lines between the second response switches T2 and the storage capacitors C, and second ends of the third response switches T3 are connected with lines between the first response switches T1 and the drive transistors T0. First ends of the fourth response switches T4 are configured to be connected with the power supply voltage end ELVDD, and second ends of the fourth response switches T4 are connected with first ends of the drive transistors T0. First ends of the fifth response switches T5 are configured to be connected with a data voltage end DATA, and second ends of the fifth response switches T5 are connected with lines between the fourth response switches T4 and the drive transistors T0. First ends of the sixth response switches T6 are connected with a second reset voltage end Vint2, and second ends of the sixth response switches T6 are connected with lines between the light emitting assemblies 10 and the first response switches T1. Among them, the first ends of the response switches refer to signal input ends, and the second ends of the response switches refer to signal output ends. The signal input ends may be a source or a drain. The control ends of the response switches refer to gate ends.

The drive circuits further include first scanning lines Scan1, second scanning lines Scan2 and display signal lines. The display signal lines are EM signal lines. Control ends of the third response switches T3, control ends of the fifth response switches T5 and control ends of the sixth response switches T6 are connected with the first scanning lines Scan1. Control ends of the second response switches T2 are connected with the second scanning lines Scan2. Control ends of the first response switches T1 and control ends of the fourth response switches T4 are connected with the display signal lines. The first scanning lines Scan1 are configured to provide first scanning signals. The second first scanning lines Scan2 are configured to provide second scanning signals. The display signal lines are configured to provide display signals.

The third response switches T3, the fifth response switches T5 and the sixth response switches T6 are turned on and off in response to the first scanning signals. When the third response switches T3, the fifth response switches T5 and the sixth response switches T6 are all P-type response switches, and when the first scanning signals are at a low level, the third response switches T3, the fifth response switches T5 and the sixth response switches T6 are turned on, and when the first scanning signals are at a high level, the third response switches T3, the fifth response switches T5 and the sixth response switches T6 are turned off.

The second response switches T2 respond to the second scanning signals. When the second response switches T2 are P-type response switches, and the second scanning signals are at a low level, the second response switches T2 are turned on. When the second scanning signals are at a high level, the second response switches T2 are turned off.

The first response switches T1 and the fourth response switches T4 respond to the display signals. When the first response switches T1 and the fourth response switches T4 are P-type response switches, and the display signals are at a low level, the first response switches T1 and the fourth response switches T4 are turned on. While the display signals are at a high level, the first response switches T1 and the fourth response switches T4 are turned off.

Besides, the first response switches T1, the second response switches T2, the third response switches T3, the fourth response switches T4, the fifth response switches T5 and the sixth response switches T6 may also be N-type response switches. The control ends of the first response switches T1, the second response switches T2, the third response switches T3, the fourth response switches T4, the fifth response switches T5 and the sixth response switches T6 are turned on at a high level and turned off at a low level.

It should also be noted that the types of the drive transistors T0 are the same as those of the first response switches T1, the second response switches T2, the third response switches T3, the fourth response switches T4, the fifth response switches T5 and the sixth response switches T6. The types may be P-type response switches or N-type response switches.

The power-on method of the display panel includes:

Step S10, acquiring a power-on signal, and generating a first initialization instruction, a second initialization instruction and a display instruction according to the power-on signal; and pressing a power-on button to generate the power-on signal in powering on, where the first initialization instruction, the second initialization instruction and the display instruction are generated according to the power-on signal. The first initialization instruction, the second initialization instruction and the display instruction may be temporally continuous signals, or may be independent signals. Generally, the first initialization instruction is executed first, then the second initialization instruction is executed, and the display instruction is finally executed.

Step S20, after initializing the storage capacitors C, initializing the storage capacitors C according to the first initialization instruction, and completing the initialization of the drive transistors T0 at the same time of the initialization of the storage capacitors C, thereby ensuring that the storage capacitors C and the drive transistors T0 obtain a stable initial state to prevent the influence of residual charges on the storage capacitors C and the drive transistors T0.

Step S30, initializing the light emitting assemblies 10 according to the second initialization instruction, where when the light emitting assemblies 10 are initialized, preset gray-scale voltages are at least provided for the light emitting assemblies 10, so as to perform a preheating startup on the light emitting assemblies 10; and the initialization of the light emitting assemblies 10 can also reduce the influence of the residual charges on the light emitting assemblies 10, and prevent the accidental flashing of the light emitting assemblies 10. In addition, the preset gray-scale voltages are provided for the light emitting assemblies 10, and the magnitudes of the gray-scale voltages are already determined. After the determined gray-scale voltages are provided for the light emitting assemblies 10, the light emitting assemblies 10 can realize pre-starting up. That is, before the light emitting assemblies 10 are officially lit, there is a preheating stage by the preset gray-scale voltages, which is equivalent to that there is a buffer stage, so that when the preheated light-emitting assemblies 10 enter normal display, the voltage difference between the lit-on light emitting assemblies 10 and the preheated light emitting assemblies 10 is smaller, thereby prolonging the service life of the light emitting assemblies 10, and then prolonging the service life of the display screen.

Step S40, controlling the light emitting assemblies 10 to display normally according to the display instruction after initializing the light emitting assemblies 10. After the initialization of the storage capacitor C is completed and the preheating startup of the light emitting assemblies 10 is completed, the light emitting assemblies 10 enter the normal display.

In the technical solution of the present embodiment, the initialization of the drive transistor TO is completed first to ensure that the storage capacitors C obtain a stable voltage. Then, the initialization of the light emitting assemblies 10 is performed, where the light emitting assemblies 10 are pre-lit under the action of the gray-scale voltages by providing the preset gray-scale voltages for the light emitting assemblies 10, so as to complete the preheating of the light emitting assemblies 10. In this way, before each powering on, the light emitting assemblies 10 are loaded with the gray-scale voltages to form a preheating startup process. The brightness span of the display screen is reduced when the display screen is officially powered on and lit on, thereby prolonging the service life of the display screen.

Figure 2:
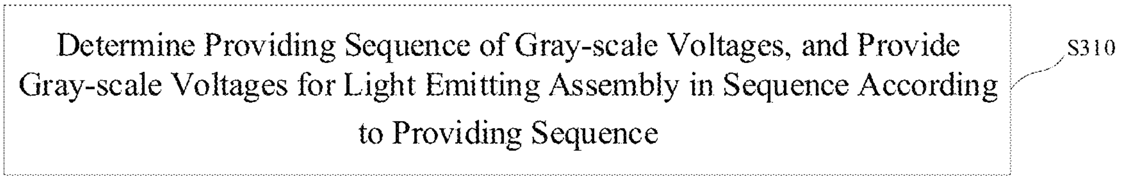
FIG. 2 is a flowchart illustrating a step S310 of a power-on method of a display panel in FIG. 1 according to the present disclosure.

Referring to FIG. 2, in order to improve the preheating startup effect of the light emitting assemblies 10, a plurality of preset gray-scale voltages are provided. The step of providing preset gray-scale voltages for the light emitting assembly 10 includes:

Step S310, determining a providing sequence of the gray-scale voltages, and providing the gray-scale voltages for the light emitting assemblies 10 in sequence according to the providing sequence. The plurality of gray-scale voltages can realize the preheating startup of the light emitting assemblies 10. The sequence of the gray-scale voltages provided for the light emitting assemblies 10 may be random or in a certain sequence. For example, when the plurality of gray-scale voltages are the same in magnitude, the gray-scale voltages may be randomly provided for the light emitting assemblies 10. When the plurality of gray-scale voltages are different in magnitude, the plurality of gray-scale voltages are sequenced according to the characteristics and the degree of influence of the light emitting assemblies 10, so as to determine the providing sequence of the gray-scale voltages. According to this providing sequence, the gray-scale voltages are respectively provided for the light emitting assemblies 10, so that the light emitting assemblies 10 can be sufficiently buffered, and the preheating startup effect of the light emitting assemblies 10 is improved.

In addition, when the plurality of gray-scale voltages are different in magnitude, the gray-scale voltage may also be randomly provided for the light emitting assemblies 10.

Figure 3:
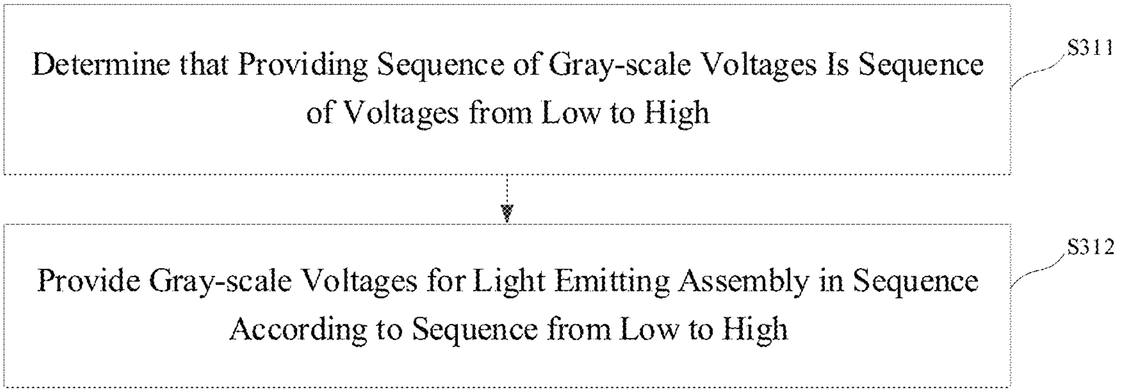
FIG. 3 is a flowchart illustrating steps S311 and S312 of a power-on method of a display panel in FIG. 1 according to the present disclosure.

Referring to FIG. 3, furthermore, the step of determining a providing sequence of the gray-scale voltages, and providing the gray-scale voltages for the light emitting assemblies 10 in sequence according to the providing sequence includes:

Step S311, determining that the providing sequence of the gray-scale voltages is a sequence of voltages from low to high, where according to the sequence from low to high, the gray-scale voltages will have a gradual increase process.

Step S312, providing the gray-scale voltages for the light emitting assemblies 10 in sequence according to the sequence from low to high. The light emitting assemblies 10 receive a low gray-scale voltage first, and then receives a large gray-scale voltage. The brightness of the light emitting assemblies 10 will have a gradual increase process, so that the impact on the light emitting assemblies 10 is small, and the buffering and preheating effects on the light emitting assemblies 10 are further improved.

In one of aspects, the plurality of gray-scale voltages include a first gray-scale voltage, a second gray-scale voltage and a third gray-scale voltage which are increased in sequence. The first gray-scale voltage corresponds to a first gray-scale brightness. The second gray-scale voltage corresponds to a second gray-scale brightness. The third gray-scale voltage corresponds to a third gray-scale brightness. A difference between the first gray-scale brightness and the second gray-scale brightness and a difference between the second gray-scale brightness and the third gray-scale brightness are both less than or equal to 6-gray-scale brightness. The 6-gray-scale brightness is small, and the difference is controlled to be smaller than the 6-gray-scale brightness to prevent the brightness difference from being large, thereby reducing the influence and impact on the light emitting assemblies 10. The 0 gray scale represents pure black, the 255 gray scale represents pure white, and the 6-gray-scale brightness is between 0 and 255. The difference may be a 1-gray-scale brightness, a 2-gray-scale brightness, or a 3-gray-scale brightness.

Figure 4:
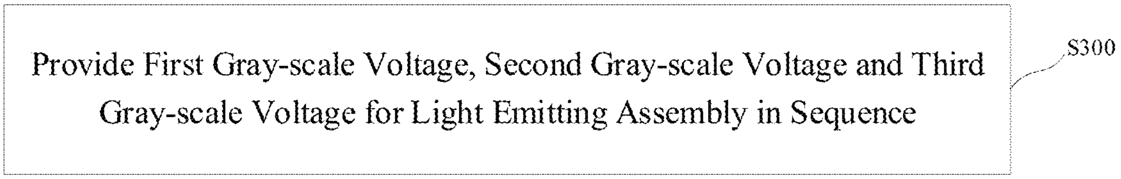
FIG. 4 is a flowchart illustrating a step S300 of a power-on method of a display panel in FIG. 1 according to the present disclosure.

Referring to FIG. 4, the step of providing preset gray-scale voltages for the light emitting assemblies 10 includes:

Step S300, providing the first gray-scale voltage, the second gray-scale voltage and the third gray-scale voltage for the light emitting assemblies 10 in sequence. Under the condition that the difference between the first gray-scale brightness and the second gray-scale brightness, and the difference between the second gray-scale brightness and the third gray-scale brightness are both less than 6-gray-scale brightness, the gray-scale voltages are provided in a sequence from low to high, so as to further alleviate the impact of a large voltage span on the light emitting assemblies 10.

In addition, the number of gray-scale voltages is not limited to 3. The smaller the gray-scale voltage difference provided is, the smaller the impact on the light emitting assemblies 10 is. For example, the number of gray-scale voltages may also be 4, 5, or 6.

Figure 5:
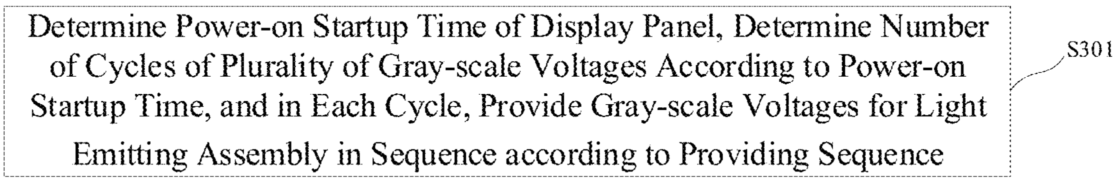
FIG. 5 is a flowchart illustrating steps S301 and S302 of a power-on method of a display panel in FIG. 1 according to the present disclosure.

Referring to FIG. 5, the step of providing preset gray-scale voltages for the light emitting assemblies 10 further includes:

Step S301, determining a power-on time of the display panel, determining the number of cycles of the plurality of gray-scale voltages according to the power-on time, and in each cycle, providing the gray-scale voltages for the light emitting assembly 10 in sequence according to the providing sequence, where a certain period of time is needed for the normal display of the light emitting assemblies 10 from the time when the power-on signal is transmitted to the display panel to the time when the display instruction is executed, and this period of time is defined as the power-on startup time. The initialization time for the storage capacitors C and the drive transistors T0 is deducted from this power-on startup time, and the remaining time is the preheating startup time for the light emitting assemblies 10. There may be a remaining time after the plurality of gray-scale voltages are provided for the light emitting assemblies 10 in sequence within the preheating startup time. In order to make full use of the remaining time, the plurality of gray-scale voltages are provided for the light emitting assemblies 10 in sequence again. Such the plurality of gray-scale voltages may be provided for a plurality of cycles. Thus, the number of cycles is precalculated by the remaining time.

More number of cycles allow the light emitting assemblies 10 to be started up circularly for multiple times. Accordingly, the more the number of cycles is, the more sufficient the buffering and preheating of the light emitting assemblies 10 are. For example, the gray-scale voltages provided for the light emitting assemblies 10 are a first gray-scale voltage, a second gray-scale voltage and a third gray-scale voltage in sequence, which constitute one cycle. After a providing sequence is completed, the first gray-scale voltage is provided, then the second gray-scale voltage is provided, and the third gray-scale voltage is finally provided, which circulate for multiple times.

If the gray-scale voltage provided for the light emitting assemblies 10 is too high, the light emitting assemblies 10 will be significantly brightened, thereby causing the brightness of the display screen to be too high, resulting in a splash screen. The existence of the splash screen will influence the user's view of the display screen, such as irritating the human eyes. In addition, the splash screen may also shorten the lifetime of the light emitting assemblies 10. In order to prolong the service life by performing a preheating startup on the light emitting assemblies 10 and reduce the splash screen in the power-on stage, the gray-scale brightness corresponding to the preset gray-scale voltage is less than or equal to the 6-gray-scale brightness. The 6-gray-scale brightness is lower than the brightness recognized by normal human eyes.

The gray-scale voltages provided for the light emitting assemblies 10 are relatively low. Although the light emitting assemblies 10 have been lit on, the brightness cannot be recognized by human eyes, so that a splash screen cannot be formed, and the human eyes cannot be irritated. For example, the gray-scale brightness of the light emitting assemblies 10 is a 1-gray-scale brightness, a 2-gray-scale brightness, or a 3-gray-scale brightness. 1, 2, and 3 represent values between 0 and 255 gray-scale brightness, respectively.

Figure 6:
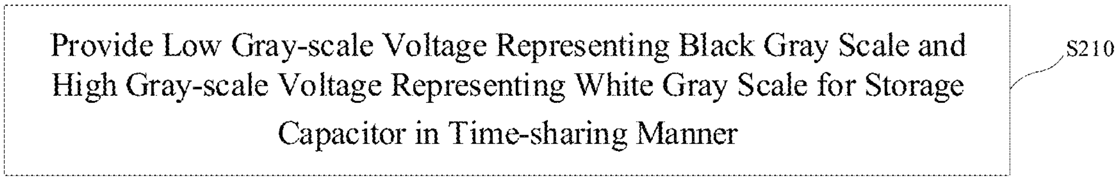
FIG. 6 is a flowchart illustrating a step S210 of a power-on method of a display panel in FIG. 1 according to the present disclosure.

Referring to FIG. 6, the step of initializing the storage capacitors C and the drive transistors T0 according to the first initialization instruction includes:

Step S210, providing a low gray-scale voltage representing a black gray scale and a high gray-scale voltage representing a white gray scale for the storage capacitors C in a time-sharing manner, where the low gray-scale voltage represents pure black, and the high gray-scale voltage represents pure white.

The low gray-scale voltage and the high gray-scale voltage represent two end points. When being initialized, the storage capacitors undergo not only the low gray-scale voltage but also the high gray-scale voltage. The circuits of the storage capacitors C and the drive transistors T0 can be guaranteed to be normally used when the black gray scale is displayed, and the circuits of the storage capacitors C and the drive transistors T0 can also be guaranteed to be normally used when the white gray scale is displayed.

In addition, the sequence of providing the low gray-scale voltage and the high gray-scale voltage is not fixed. The low gray-scale voltage may be provided first, and then the high gray-scale voltage is provided. Or, the low gray-scale voltage may be provided for several consecutive frames, and then the high gray-scale voltage is provided. Or, a frame of low gray-scale voltage may be provided, and then a frame of high gray-scale voltage is provided, such high and low switching. In a word, the storage capacitors C can receive both the low gray-scale voltage and the high gray-scale voltage in the initialization stage.

Figure 14:
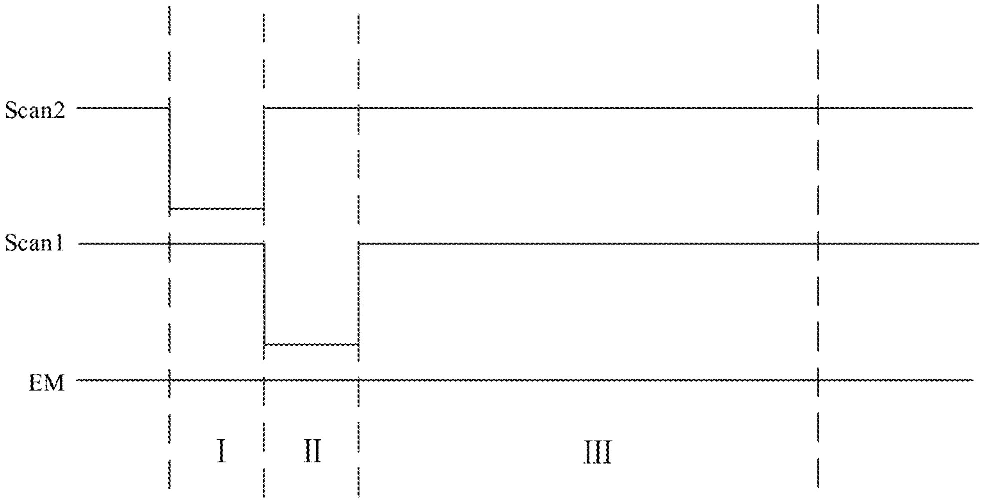
FIG. 14 is a timing chart of a drive circuit of a display panel according to the present disclosure when the storage capacitor is initialized.

Referring to FIG. 7 and FIG. 14, it should be further noted that the process of initializing the storage capacitors C according to the first initialization instruction may be divided into three stages.

Figure 8:
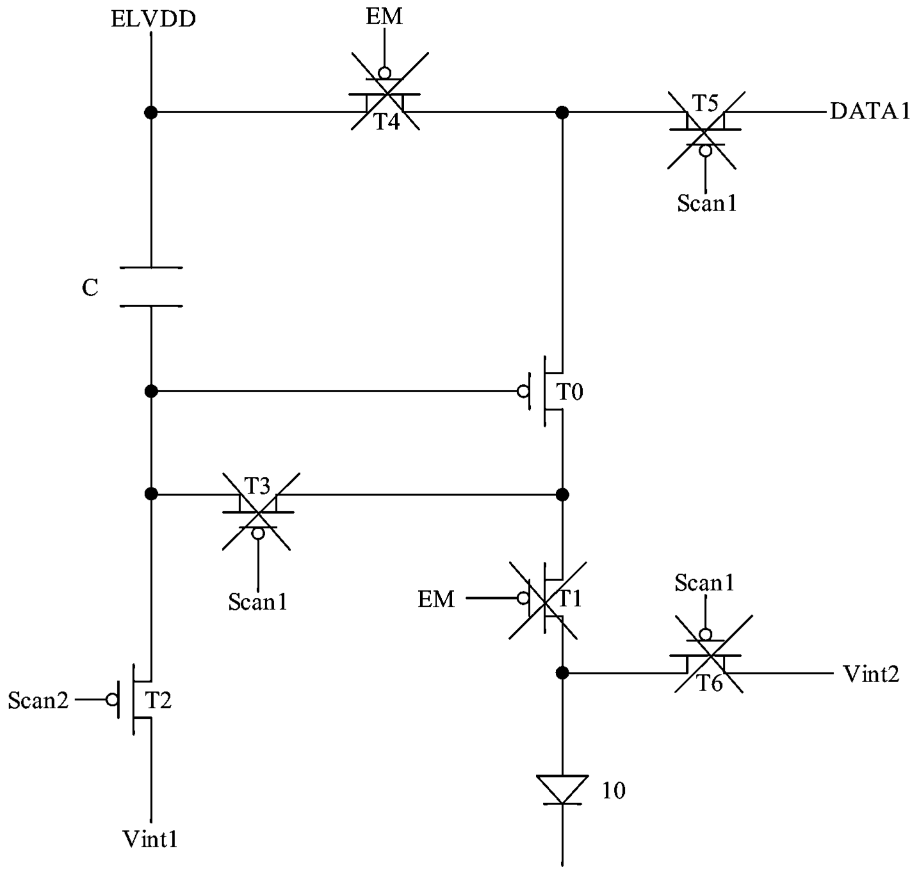
FIG. 8 is a schematic diagram of a circuit connection structure of a drive circuit of a display panel according to the present disclosure in the reset stage of a storage capacitor and a drive transistor when the storage capacitor is initialized.

The step of initializing the storage capacitors C according to the first initialization instruction includes:

Referring to FIG. 8, in the first stage I, the first scanning line Scan1 provides a high level, the display signaling line provides a high level, and the second scanning line Scan2 provides a low level. The first response switches T1 and the fourth response switches T4 are turned off in response to the display signals, the third response switches T3, the fifth response switches T5 and the sixth response switches T6 are turned off in response to the first scanning signals, and the second response switches T2 are turned on in response to the second scanning signals. A voltage of the first low-voltage reset end is provided for the storage capacitors C, so as to perform a voltage reset on the storage capacitors C.

Figure 9:
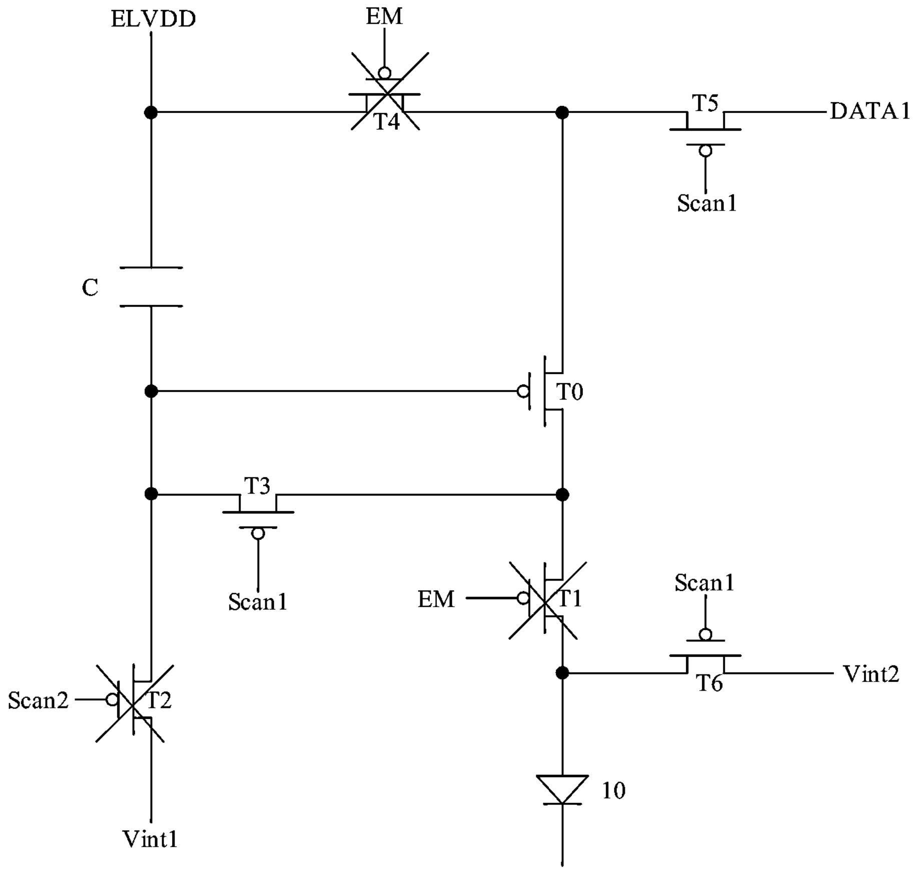
FIG. 9 is a schematic diagram of a circuit connection structure in which a drive circuit of a display panel according to the present disclosure provides a data voltage for a storage capacitor and a drive transistor when the storage capacitor is initialized.

Referring to FIG. 9, in the second stage II, after the voltage reset is performed on the storage capacitors C, the first scanning line Scan1 provides a low level, the display signaling line provides a high level, and the second scanning line Scan2 provides a high level. The first response switches T1 and the fourth response switches T4 are turned off in response to the display signals. The third response switches T3, the fifth response switches T5 and the sixth response switches T6 are turned on in response to the first scanning signals. The second response switches T2 are turned off in response to the second scanning signals. A low gray-scale voltage representing a black gray scale is provided for the storage capacitors C, and a high gray-scale voltage representing a white gray scale is then provided for the storage capacitors C, so as to charge the storage capacitors C. The first data voltage DATA1 is provided for the storage capacitors C through the drive transistors T0. In addition, the second reset voltage end Vint2 resets the anodes of the light emitting assemblies 10.

Figure 10:
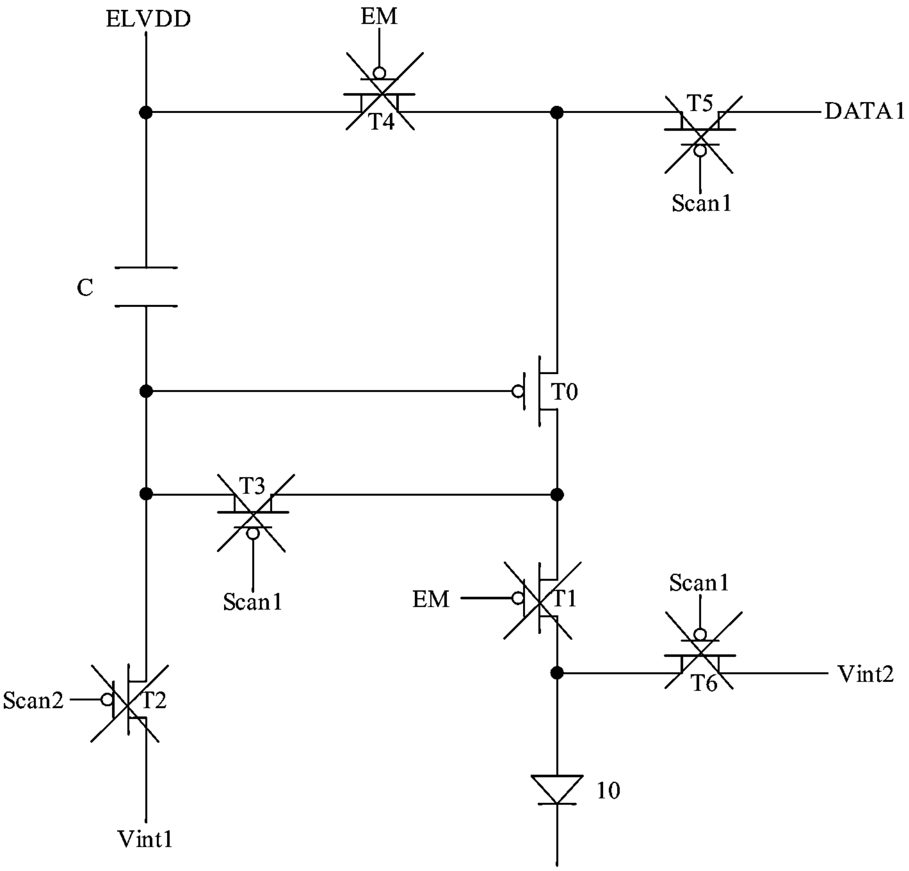
FIG. 10 is a schematic diagram of a circuit connection structure of a drive circuit of a display panel according to the present disclosure when a storage capacitor is initialized.

Referring to FIG. 10, in the third stage III, after the storage capacitors C are charged, the first scanning line Scan1 provides a high level, the display signaling line provides a high level, and the second scanning line Scan2 provides a high level. The first response switches T1 and the fourth response switches T4 are turned off in response to the display signals, the third response switches T3, the fifth response switches T5 and the sixth response switches T6 are turned off in response to the first scanning signals, and the second response switches T2 are turned off in response to the second scanning signals, so as to perform a voltage initialization on the storage capacitors C.

Figure 15:
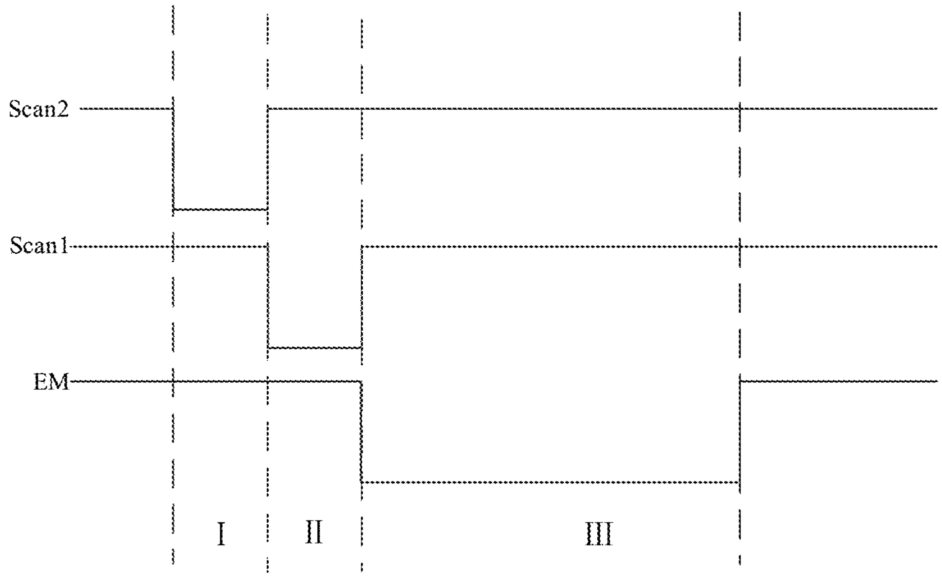
FIG. 15 is a timing chart of a drive circuit of a display panel according to the present disclosure when the light emitting assembly is initialized.

Referring to FIG. 7 and FIG. 15, in addition, the process of initializing the light emitting assemblies 10 according to the second initialization instruction may also be divided into three stages.

Figure 11:
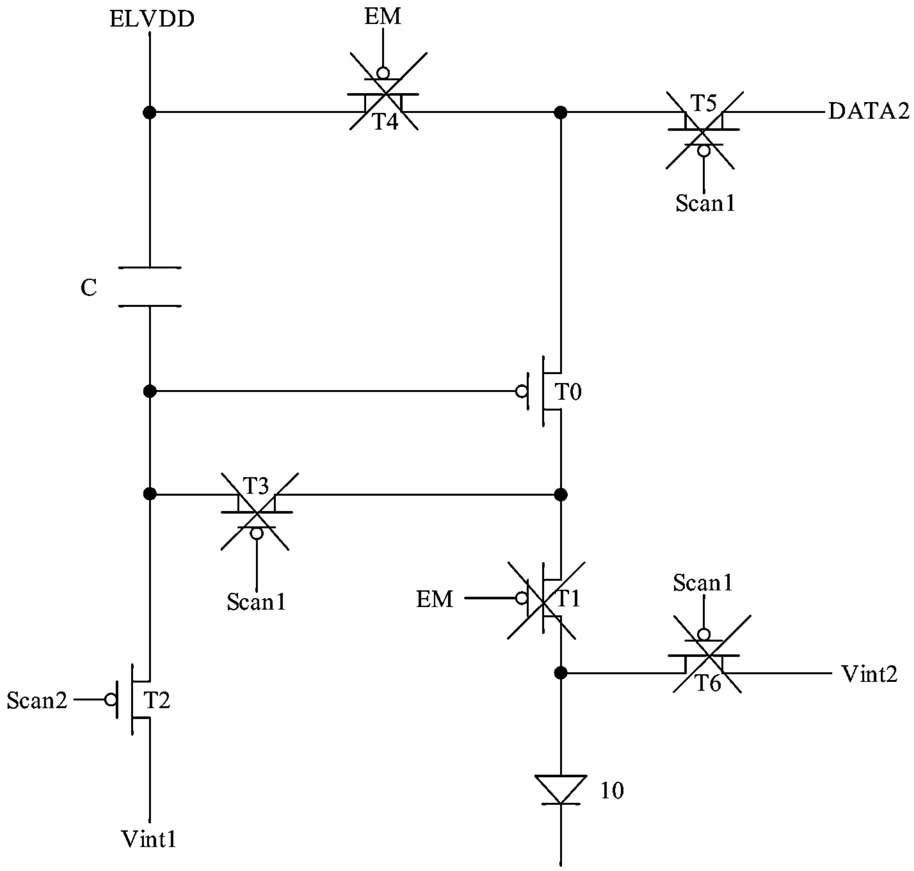
FIG. 11 is a schematic diagram of a circuit connection structure of a drive circuit of a display panel according to the present disclosure in the reset stage of a storage capacitor and a drive transistor when a light emitting assembly is initialized.

The step of initializing the light emitting assemblies 10 according to the second initialization instruction includes:

Referring to FIG. 11, in the first stage I, the first scanning line Scan1 provides a high level, the display signaling line provides a high level, and the second scanning line Scan2 provides a low level. The first response switches T1 and the fourth response switches T4 are turned off in response to the display signals. The third response switches T3, the fifth response switches T5 and the sixth response switches T6 are turned off in response to the first scanning signals. The second response switches T2 are turned on in response to the second scanning signals. A voltage of the first low-voltage reset end is provided for the storage capacitors C, so as to perform a voltage reset on the storage capacitors C.

Figure 12:
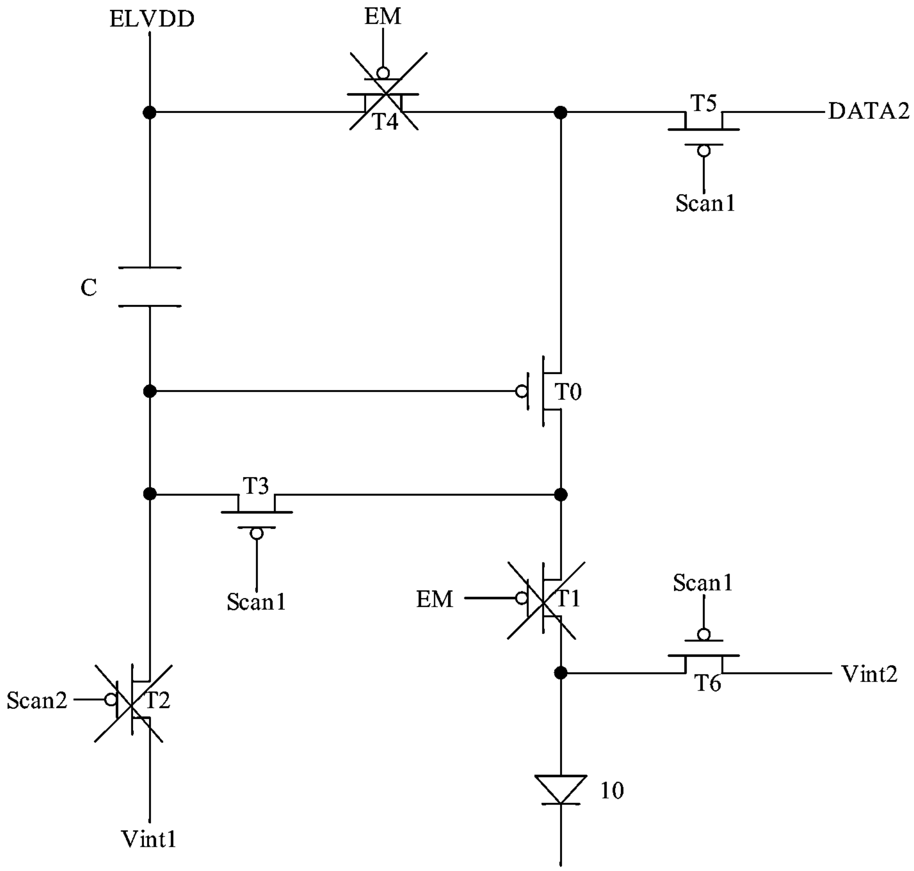
FIG. 12 is a schematic diagram of a circuit connection structure in which a drive circuit of a display panel according to the present disclosure provides a data voltage for a storage capacitor and a drive transistor when a light emitting assembly is initialized.

Referring to FIG. 12, in the second stage II, after the voltage reset is performed on the storage capacitors C, the first scanning line Scan1 provides a low level, the display signaling line provides a high level, and the second scanning line Scan2 provides a high level. The first response switches T1 and the fourth response switches T4 are turned off in response to the display signal. The third response switches T3, the fifth response switches T5 and the sixth response switches T6 are turned on in response to the first scanning signals. The second response switches T2 are turned off in response to the second scanning signals. The preset gray-scale voltages are provided for the storage capacitors C, so as to charge the storage capacitors C. The preset gray-scale voltages are a second data voltage DATA2, and the second data voltage DATA2 is provided for the storage capacitors C through the drive transistors T0. In addition, the second reset voltage end Vint2 resets the anodes of the light emitting assemblies 10.

Figure 13:
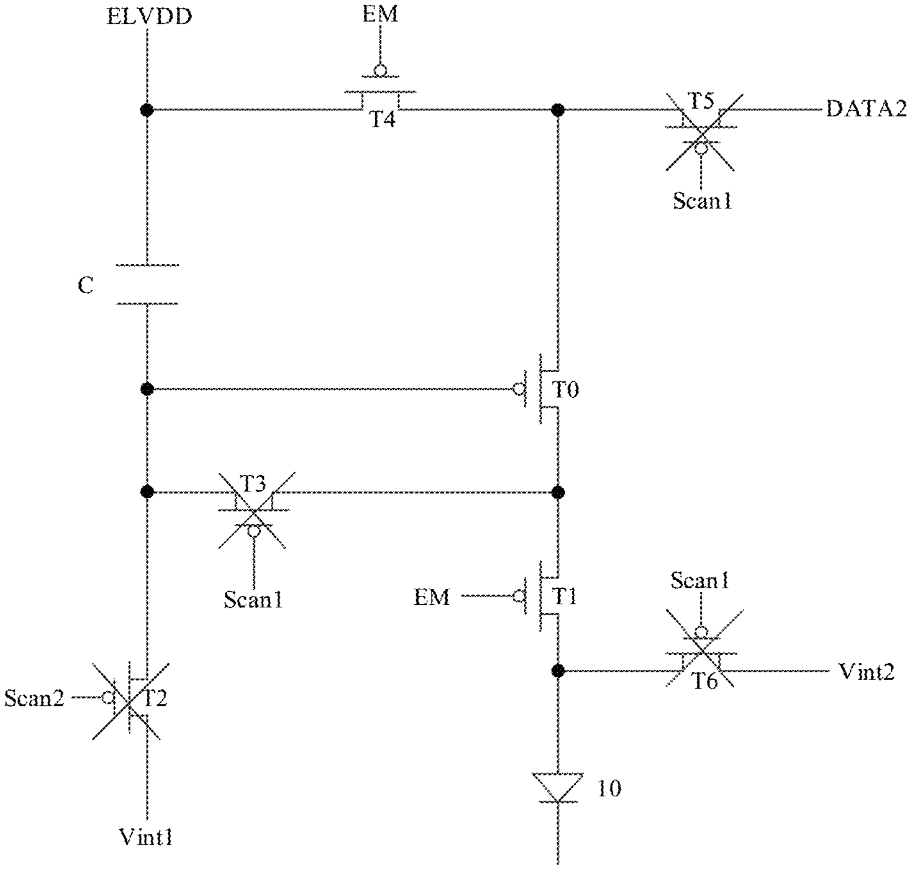
FIG. 13 is a schematic diagram of a circuit connection structure in which a drive circuit of a display panel according to the present disclosure performs a preheating startup on the light emitting assembly when the light emitting assembly is initialized.

Referring to FIG. 13, in the third stage III, after the storage capacitors C are charged, the first response switches T1 and the fourth response switches T4 are turned on in response to the display signals, the third response switches T3, the fifth response switches T5 and the sixth response switches T6 are turned off in response to the first scanning signals, and the second response switches T2 are turned off in response to the second scanning signals. The preset gray-scale voltages stored by the storage capacitors C are provided for the light emitting assemblies 10, so as to perform a preheating startup on the light emitting assemblies 10.

Embodiment 2

The present disclosure further provides a display panel. The display panel is powered on by using the above power-on method of the display panel.

The embodiments and beneficial effects of the display panel refer to the above embodiments of the power-on method of the display panel, which are not described here.

Although the present disclosure has been described with reference to several exemplary embodiments, it is to be understood that the terminology, which has been used, is intended to be in the nature of words of description and illustration, rather than of limitation. As the present disclosure may be embodied in several forms without departing from the spirit or essential characteristics thereof, it should also be understood that the above embodiments are not limited to any of the details of the foregoing description, but rather should be construed broadly within its spirit and scope as defined in the appended claims, and therefore all changes and modifications that fall within the scope of the claims or the equivalents thereof are intended to be embraced by the appended claims.

What is claimed is:

1. A power-on method of a display panel, the display panel comprising a plurality of sub-pixels, each sub-pixel being correspondingly provided with a drive circuit, and the drive circuit comprising a light emitting assembly and a storage capacitor, wherein the power-on method of the display panel comprises:

acquiring a power-on signal, and generating a first initialization instruction, a second initialization instruction and a display instruction according to the power-on signal;

initializing the storage capacitor according to the first initialization instruction;

initializing the light emitting assembly according to the second initialization instruction after initializing the storage capacitor, and at least providing preset gray-scale voltages for the light emitting assembly, so as to perform a preheating startup on the light emitting assembly; and controlling the light emitting assembly to display normally according to the display instruction after initializing the light emitting assembly.

2. The power-on method of the display panel according to claim 1, wherein a plurality of preset gray-scale voltages are provided; and the step of providing the preset gray-scale voltages for the light emitting assembly comprises:

determining a providing sequence of the plurality of preset gray-scale voltages, and providing the plurality of preset gray-scale voltages for the light emitting assembly in sequence according to the providing sequence.

3. The power-on method of the display panel according to claim 2, wherein the step of determining the providing sequence of the plurality of preset gray-scale voltages, and providing the plurality of preset gray-scale voltages for the light emitting assembly in sequence according to the providing sequence comprises:

determining that the providing sequence of the plurality of preset gray-scale voltages is a sequence of voltages from low to high; and providing the plurality of preset gray-scale voltages for the light emitting assembly in sequence according to the sequence from low to high.

4. The power-on method of the display panel according to claim 2, wherein the plurality of preset gray-scale voltages comprise a first gray-scale voltage, a second gray-scale voltage and a third gray-scale voltage which are increased in sequence, the first gray-scale voltage corresponding to a first gray-scale brightness, the second gray-scale voltage corresponding to a second gray-scale brightness, the third gray-scale voltage corresponding to a third gray-scale brightness, and a difference between the first gray-scale brightness and the second gray-scale brightness and a difference between the second gray-scale brightness and the third gray-scale brightness being both less than or equal to a 6-gray-scale brightness; and the step of providing the preset gray-scale voltages for the light emitting assembly comprises:

providing the first gray-scale voltage, the second gray-scale voltage and the third gray-scale voltage for the light emitting assembly in sequence.

5. The power-on method of the display panel according to claim 2, wherein the step of providing the preset gray-scale voltages for the light emitting assembly further comprises:

determining a power-on startup time of the display panel, determining a number of cycles of the plurality of preset gray-scale voltages according to the power-on startup time, and in each cycle, providing the plurality of preset gray-scale voltages for the light emitting assembly in sequence according to the providing sequence.

6. The power-on method of the display panel according claim 1, wherein a gray-scale brightness corresponding to the preset gray-scale voltage is less than or equal to a 6-gray-scale brightness.

7. The power-on method of the display panel according to claim 1, wherein the step of initializing the storage capacitor according to the first initialization instruction comprises:

providing a low gray-scale voltage representing a black gray scale and a high gray-scale voltage representing a white gray scale for the storage capacitor in a time-sharing manner.

8. The power-on method of the display panel according to claim 1, wherein the drive circuit further comprises a drive transistor, a first response switch, a second response switch, a third response switch, a fourth response switch, a fifth response switch, and a sixth response switch, a first end of the first response switch being connected with a second end of the drive transistor, a second end of the first response switch being connected with an anode of the light emitting assembly, a control end of the drive transistor being connected with a first end of the storage capacitor, and a second end of the storage capacitor being configured to be connected with a power supply voltage end;

wherein a first end of the second response switch is configured to be connected with a first reset voltage end, and a second end of the second response switch is connected with a line between the storage capacitor and the drive transistor; a first end of the third response switch is connected with a line between the second response switch and the storage capacitor, and a second end of the third response switch is connected with a line between the first response switch and the drive transistor; a first end of the fourth response switch is configured to be connected with a power supply voltage end, and a second end of the fourth response switch is connected with a first end of the drive transistor; a first end of the fifth response switch is configured to be connected with a data voltage end, and a second end of the fifth response switch is connected with a line between the fourth response switch and the drive transistor; a first end of the sixth response switch is connected with a second reset voltage end, and a second end of the sixth response switch is connected with a line between the light emitting assembly and the first response switch;

wherein the drive circuit further includes a first scanning line, a second scanning line, and a display signal line, a control end of the third response switch, a control end of the fifth response switch and a control end of the sixth response switch being connected with the first scanning line; a control end of the second response switch being connected with the second scanning line; a control end of the first response switch and a control end of the fourth response switch being connected with the display signal line; the first scanning line being configured to provide a first scanning signal, the second scanning line is configured to provide a second scanning signal, and the display signal line being configured to provide a display signal; and the step of initializing the storage capacitor according to the first initialization instruction comprises:

turning off the first response switch and the fourth response switch in response to the display signal, turning off the third response switch, the fifth response switch and the sixth response switch in response to the first scanning signal, and turning on the second response switch in response to the second scanning signal, and providing a voltage of a first low-voltage reset end for the storage capacitor, so as to perform a voltage reset on the storage capacitor;

after performing the voltage reset on the storage capacitor, turning off the first response switch and the fourth response switch in response to the display signal, turning on the third response switch, the fifth response switch and the sixth response switch in response to the first scanning signal, turning off the second response switch in response to the second scanning signal, and providing a low gray-scale voltage representing a black gray scale for the storage capacitor, and providing a high gray-scale voltage representing a white gray scale for the storage capacitor, so as to charge the storage capacitor; and after charging the storage capacitor, turning off the first response switch and the fourth response switch in response to the display signal, turning off the third response switch, the fifth response switch and the sixth response switch in response to the first scanning signal, and turning off the second response switch in response to the second scanning signal, so as to perform a voltage initialization on the storage capacitor.

9. The power-on method of the display panel according to claim 8, wherein the step of initializing the light emitting assembly according to the second initialization instruction comprises:

turning off the first response switch and the fourth response switch in response to the display signal, turning off the third response switch, the fifth response switch and the sixth response switch in response to the first scanning signal, and turning on the second response switch in response to the second scanning signal, and providing a voltage of the first low-voltage reset end for the storage capacitor, so as to perform a voltage reset on the storage capacitor;

after performing the voltage reset on the storage capacitor, turning off the first response switch and the fourth response switch in response to the display signal, turning on the third response switch, the fifth response switch and the sixth response switch in response to the first scanning signal, turning off the second response switch in response to the second scanning signal, and providing a preset gray-scale voltage for the storage capacitor, so as to charge the storage capacitor; and after charging the storage capacitor, turning on the first response switch and the fourth response switch in response to the display signal, turning off the third response switch, the fifth response switch and the sixth response switch in response to the first scanning signal, and turning off the second response switch in response to the second scanning signal, and providing the preset gray-scale voltage stored by the storage capacitor for the light emitting assembly, so as to perform a preheating startup on the light emitting assembly.

10. A display panel, wherein the display panel is powered on by using a power-on method, wherein the display panel comprises a plurality of sub-pixels, each sub-pixel being correspondingly provided with a drive circuit, and the drive circuit comprising a light emitting assembly and a storage capacitor, wherein the power-on method of the display panel comprises:

acquiring a power-on signal, and generating a first initialization instruction, a second initialization instruction and a display instruction according to the power-on signal;

initializing the storage capacitor according to the first initialization instruction;

initializing the light emitting assembly according to the second initialization instruction after initializing the storage capacitor, and at least providing preset gray-scale voltages for the light emitting assembly, so as to perform a preheating startup on the light emitting assembly; and controlling the light emitting assembly to display normally according to the display instruction after initializing the light emitting assembly.

11. The display panel according to claim 10, wherein a plurality of preset gray-scale voltages are provided; and the step of providing the preset gray-scale voltages for the light emitting assembly comprises:

determining a providing sequence of the plurality of preset gray-scale voltages, and providing the plurality of preset gray-scale voltages for the light emitting assembly in sequence according to the providing sequence.

12. The display panel according to claim 11, wherein the step of determining the providing sequence of the plurality of preset gray-scale voltages, and providing the plurality of preset gray-scale voltages for the light emitting assembly in sequence according to the providing sequence comprises:

determining that the providing sequence of the plurality of preset gray-scale voltages is a sequence of voltages from low to high; and providing the plurality of preset gray-scale voltages for the light emitting assembly in sequence according to the sequence from low to high.

13. The display panel according to claim 11, wherein the plurality of preset gray-scale voltages comprise a first gray-scale voltage, a second gray-scale voltage and a third gray-scale voltage which are increased in sequence, the first gray-scale voltage corresponding to a first gray-scale brightness, the second gray-scale voltage corresponding to a second gray-scale brightness, the third gray-scale voltage corresponding to a third gray-scale brightness, and a difference between the first gray-scale brightness and the second gray-scale brightness and a difference between the second gray-scale brightness and the third gray-scale brightness being both less than or equal to a 6-gray-scale brightness; and the step of providing the preset gray-scale voltages for the light emitting assembly comprises:

providing the first gray-scale voltage, the second gray-scale voltage and the third gray-scale voltage for the light emitting assembly in sequence.

14. The display panel according to claim 11, wherein the step of providing the preset gray-scale voltages for the light emitting assembly further comprises:

determining a power-on startup time of the display panel, determining a number of cycles of the plurality of preset gray-scale voltages according to the power-on startup time, and in each cycle, providing the plurality of preset gray-scale voltages for the light emitting assembly in sequence according to the providing sequence.

15. The display panel according to claim 10, wherein a gray-scale brightness corresponding to the preset gray-scale voltage is less than or equal to a 6-gray-scale brightness.

16. The display panel according to claim 10, wherein the step of initializing the storage capacitor according to the first initialization instruction comprises:

providing a low gray-scale voltage representing a black gray scale and a high gray-scale voltage representing a white gray scale for the storage capacitor in a time-sharing manner.

17. The display panel according to claim 10, wherein the drive circuit further comprises a drive transistor, a first response switch, a second response switch, a third response switch, a fourth response switch, a fifth response switch, and a sixth response switch, a first end of the first response switch being connected with a second end of the drive transistor, a second end of the first response switch being connected with an anode of the light emitting assembly, a control end of the drive transistor being connected with a first end of the storage capacitor, and a second end of the storage capacitor being configured to be connected with a power supply voltage end;

wherein a first end of the second response switch is configured to be connected with a first reset voltage end, and a second end of the second response switch is connected with a line between the storage capacitor and the drive transistor; a first end of the third response switch is connected with a line between the second response switch and the storage capacitor, and a second end of the third response switch is connected with a line between the first response switch and the drive transistor; a first end of the fourth response switch is configured to be connected with a power supply voltage end, and a second end of the fourth response switch is connected with a first end of the drive transistor; a first end of the fifth response switch is configured to be connected with a data voltage end, and a second end of the fifth response switch is connected with a line between the fourth response switch and the drive transistor; a first end of the sixth response switch is connected with a second reset voltage end, and a second end of the sixth response switch is connected with a line between the light emitting assembly and the first response switch;

wherein the drive circuit further includes a first scanning line, a second scanning line, and a display signal line, a control end of the third response switch, a control end of the fifth response switch and a control end of the sixth response switch being connected with the first scanning line; a control end of the second response switch being connected with the second scanning line; a control end of the first response switch and a control end of the fourth response switch being connected with the display signal line; the first scanning line being configured to provide a first scanning signal, the second scanning line is configured to provide a second scanning signal, and the display signal line being configured to provide a display signal; and the step of initializing the storage capacitor according to the first initialization instruction comprises:

turning off the first response switch and the fourth response switch in response to the display signal, turning off the third response switch, the fifth response switch and the sixth response switch in response to the first scanning signal, and turning on the second response switch in response to the second scanning signal, and providing a voltage of a first low-voltage reset end for the storage capacitor, so as to perform a voltage reset on the storage capacitor;

after performing the voltage reset on the storage capacitor, turning off the first response switch and the fourth response switch in response to the display signal, turning on the third response switch, the fifth response switch and the sixth response switch in response to the first scanning signal, turning off the second response switch in response to the second scanning signal, and providing a low gray-scale voltage representing a black gray scale for the storage capacitor, and providing a high gray-scale voltage representing a white gray scale for the storage capacitor, so as to charge the storage capacitor; and after charging the storage capacitor, turning off the first response switch and the fourth response switch in response to the display signal, turning off the third response switch, the fifth response switch and the sixth response switch in response to the first scanning signal, and turning off the second response switch in response to the second scanning signal, so as to perform a voltage initialization on the storage capacitor.

18. The display panel according to claim 17, wherein the step of initializing the light emitting assembly according to the second initialization instruction comprises:

turning off the first response switch and the fourth response switch in response to the display signal, turning off the third response switch, the fifth response switch and the sixth response switch in response to the first scanning signal, and turning on the second response switch in response to the second scanning signal, and providing a voltage of the first low-voltage reset end for the storage capacitor, so as to perform a voltage reset on the storage capacitor;

after performing the voltage reset on the storage capacitor, turning off the first response switch and the fourth response switch in response to the display signal, turning on the third response switch, the fifth response switch and the sixth response switch in response to the first scanning signal, turning off the second response switch in response to the second scanning signal, and providing a preset gray-scale voltage for the storage capacitor, so as to charge the storage capacitor; and after charging the storage capacitor, turning on the first response switch and the fourth response switch in response to the display signal, turning off the third response switch, the fifth response switch and the sixth response switch in response to the first scanning signal, and turning off the second response switch in response to the second scanning signal, and providing the preset gray-scale voltage stored by the storage capacitor for the light emitting assembly, so as to perform a preheating startup on the light emitting assembly.

* * * * *